United States Patent [19]

Bitzer

[11] Patent Number: 4,810,158

[45] Date of Patent: Mar. 7, 1989

[54] KIT FOR EASY ONE-PERSON REMOVAL OF A TRUCK CAP

[76] Inventor: Howard C. Bitzer, 161 E. Gilmore Ave., Trafford, Pa. 15085

[21] Appl. No.: 24,825

[22] Filed: Mar. 12, 1987

[51] Int. Cl.$^4$ ............................................. B60J 7/02
[52] U.S. Cl. ........................................ 414/498; 16/45; 16/97; 280/47.131; 296/100
[58] Field of Search .................. 414/498; 296/100; 280/47.13 R, 767; 16/18 R, 30, 45, 46, 97, 98, 100, 102

[56] References Cited

U.S. PATENT DOCUMENTS

| | | | |
|---|---|---|---|
| 1,343,758 | 6/1920 | Austin | 16/18 R |
| 3,142,085 | 7/1964 | Black | 16/18 R |
| 3,598,261 | 8/1971 | Anderson | 414/498 |
| 3,773,380 | 11/1973 | Stockdill | 296/137 B |
| 3,806,187 | 4/1974 | Bull | 296/137 B |
| 3,883,020 | 5/1975 | Dehn | 214/515 |
| 3,897,100 | 7/1975 | Gardner | 296/10 |
| 3,901,548 | 8/1975 | Seaman, Jr. | 296/10 |
| 4,068,886 | 1/1978 | Gostomski | 296/137 B |
| 4,243,260 | 1/1981 | Gieseking | 296/24 R |
| 4,289,346 | 9/1981 | Bourgeois | 296/105 |
| 4,397,497 | 8/1983 | Alonzo, Jr. et al. | 296/100 X |
| 4,563,034 | 1/1986 | Lamb | 296/98 |
| 4,648,649 | 3/1987 | Beal | 296/100 X |

OTHER PUBLICATIONS

Wheels and Casters Brochure, Sep. 1951.

*Primary Examiner*—Robert J. Spar
*Assistant Examiner*—David A. Bucci
*Attorney, Agent, or Firm*—Nils H. Ljungman

[57] ABSTRACT

A kit for enabling one person to easily and efficiently remove a truck cap from over a truck bed. The cap is provided with hold down bolt holes. The lot includes detachable forward rollers for attaching to and detaching from a forward portion of the truck cap, and for rollingly engaging the truck bed and maintaining the truck cap in rolling engagement with the truck bed when the detachably forward rollers are attached to the truck cap and when the truck cap is disposed over the truck bed. The kit also includes detachable rear wheels for attaching to and detaching from a rear portion of the truck cap and for providing the truck cap with rolling mobility upon removal of the truck cap from the truck bed.

7 Claims, 3 Drawing Sheets

KIT FOR EASY ONE-PERSON REMOVAL OF A TRUCK CAP

BACKGROUND OF THE INVENTION

1. Field of the Invention

The present invention relates to truck caps, such as those found on conventional pickup trucks, and more particularly to a detachable kit which enables one person to easily and efficiently remove such a truck cap from over a truck bed and reinstall same.

2. Description of the Prior Art

So called "truck caps" are an often purchased accessory for a conventional pickup truck. When installed they convert the bed of a pickup truck into a reasonably weather secure compartment.

However, due to their large and unwieldy size, mounting and dismounting a truck cap from the bed of a truck can prove to be a time consuming and difficult operation, particularly if attempted by one person.

U.S. Pat. No. 3,897,100 to Gardner relates to a pickup truck cap which is mounted to the sidewalls of the cargo body by a system of rails in order that it may slide back and forth on the cargo body, antifriction means in the form of rollers being disposed within the sliding rails.

U.S. Pat. No. 3,773,380 to Stockdill relates to a pickup truck cargo cover having channel-shaped rails which slidingly engage a pair T-shaped tracks which are secured to the side walls of the truck body.

U.S. Pat. No. 3,883,020 to Dehn relates to a framework adapted to be loaded and unloaded from the bed of a pickup truck, the framework having rollers on its leading edge which contact the truck bed, intermediate legs provided with wheels aft of the leading edge and rigid legs provided at the trailing edge of the framework.

OBJECTS OF THE INVENTION

A primary object of the present invention is the provision of means to enable easy and efficient removal and installation of a truck cap from over the bed of a pickup truck.

An additional object of the present invention is the provision of such means to enable one person to easily and efficiently remove and install such a truck cap.

Another object of the present invention is the provision of means to enable one person to easily transport such a truck cap.

A further object of the present invention is the provision of such means in a detachable kit form which is of uncomplicated design and yet suitable for use with a wide variety of truck caps.

An even further object of the present invention is the provision of a truck cap with such means for installation, removal and transport detachably installed thereon.

SUMMARY OF THE INVENTION

In general, the invention features a kit for enabling one person to easily and efficiently remove a truck cap from over a truck bed. The cap is provided with hold down bolt holes. The kit includes detachable forward rollers for attaching to and detaching from a forward portion of the truck cap, and for rollingly engaging the truck bed and maintaining the truck cap in rolling engagement with the truck bed when the detachably forward rollers are attached to the truck cap and when the truck cap is disposed over the truck bed. The kit also includes detachable rear wheels for attaching to and detaching from a rear portion of the truck cap and for providing the truck cap with rolling mobility upon removal of the truck cap from the truck bed.

These and other features of the invention will now be described by way of a preferred embodiment after first briefly describing the accompanying drawings, wherein:

DESCRIPTION OF THE PREFERRED EMBODIMENT

Figure 1:
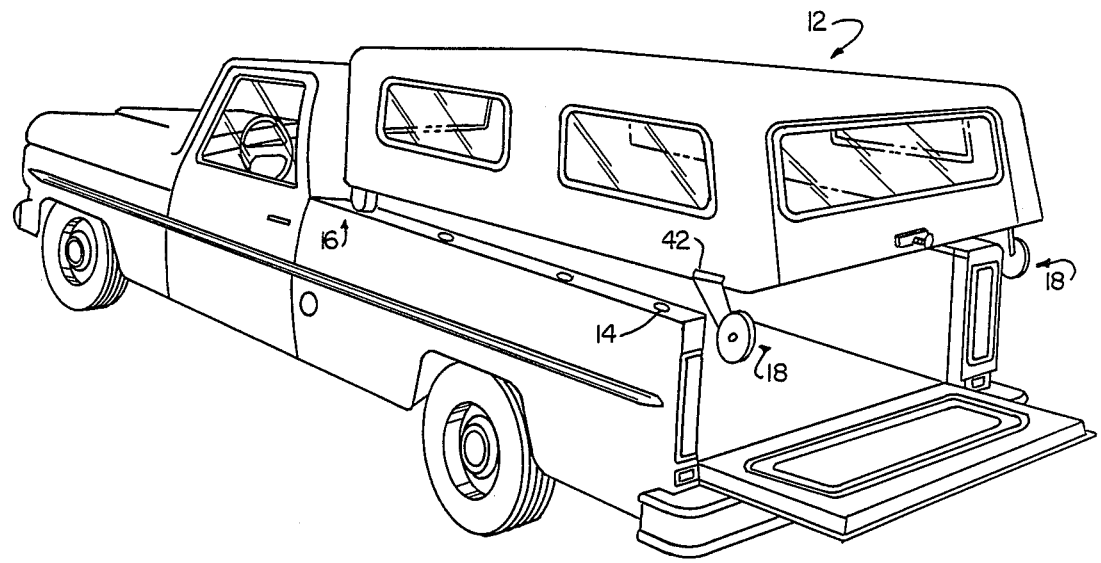
FIG. 1 is a perspective view of a conventional pickup truck provided with a truck cap to which there is attached a kit for mounting or dismounting the truck cap according to the invention.

Referring first to FIG. 1, a conventional pickup truck 10 is provided with a truck cap 12, which is a quite often purchased accessory for such pickup trucks and may be purchased with the truck or separately. Such truck 12 caps normally consist of a molded or fabricated shell and are secured to the bed of the truck by way of more or less conventional hold down bolts (not shown) which pass through bolt holes 14 provided on the rails of the sidewalls of the pickup truck bed 14 and corresponding holes (not shown) provided on inwardly turned lateral edges of the truck cap 12.

Substantially all truck caps are provided with at least four bolt holes located in the four corners of the truck cap, while some caps are provided with intermediate bolt holes. The four corner bolt holes provide means for attachment of the present invention to a wide variety of truck caps.

In FIG. 1, a kit constructed according to the present invention has been installed between the truck cap 12 and the truck bed to allow for easy and efficient one-person installation, removal, transport and storage of truck cap 12. The kit includes two detachable forward roller assemblies 16 for attaching to the forward portion of truck cap 12 via hold down bolt holes provided in laterally inturned edges of truck cap 12. The kit also includes two detachable rear wheel assemblies 18 which likewise attach to the rear portion of truck 12 via additional hold down bolt holes provided on laterally inturned edges of truck cap 12.

Figure 2:
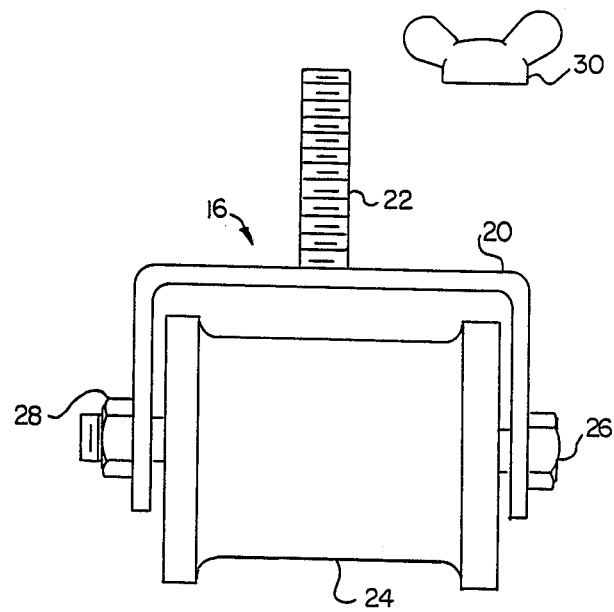
FIG. 2 is a front plan view of a front roller assembly constructed according to the invention.
Figure 3:
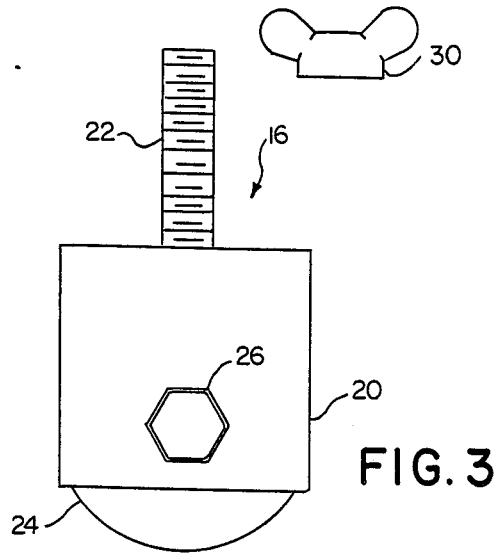
FIG. 3 is a side plan view of the front roller assembly of FIG. 2.

Referring now to FIGS. 2 and 3, showing one front roller assembly 16 of the present invention in greater detail, each front roller assembly 16 generally includes a U-shaped bracket 20, a threaded shaft 22 rigidly attached thereto and projecting upwards therefrom, and an "apple core" shaped roller 24 rotatably mounted within bracket 20 via a bolt 26 and a nut 28. Each front roller assembly 16 also includes an associated wing nut 30.

Preferbly, roller 24, inasmuch as it generally comes in direct contact with a painted surface of pickup truck 10 during use of the invention, is constructed of a non-marring material. Even more preferably, roller 24 is a commercially available non-marring roller, such as a plastic roller used in boat trailers. Preferably, roller 24 has a diameter ranging from about 1 inch to about 4 inches. Even more preferably, the diameter of roller 24 is about 1.5 inches.

Figure 5:
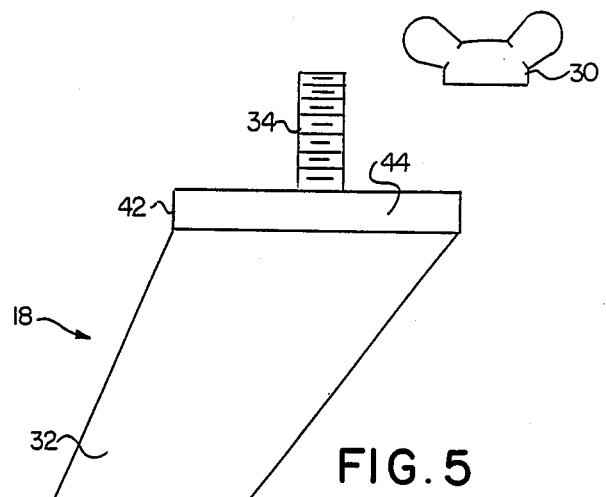
FIG. 5 is a side plan view of the rear wheel assembly of FIG. 4.
Figure 4:
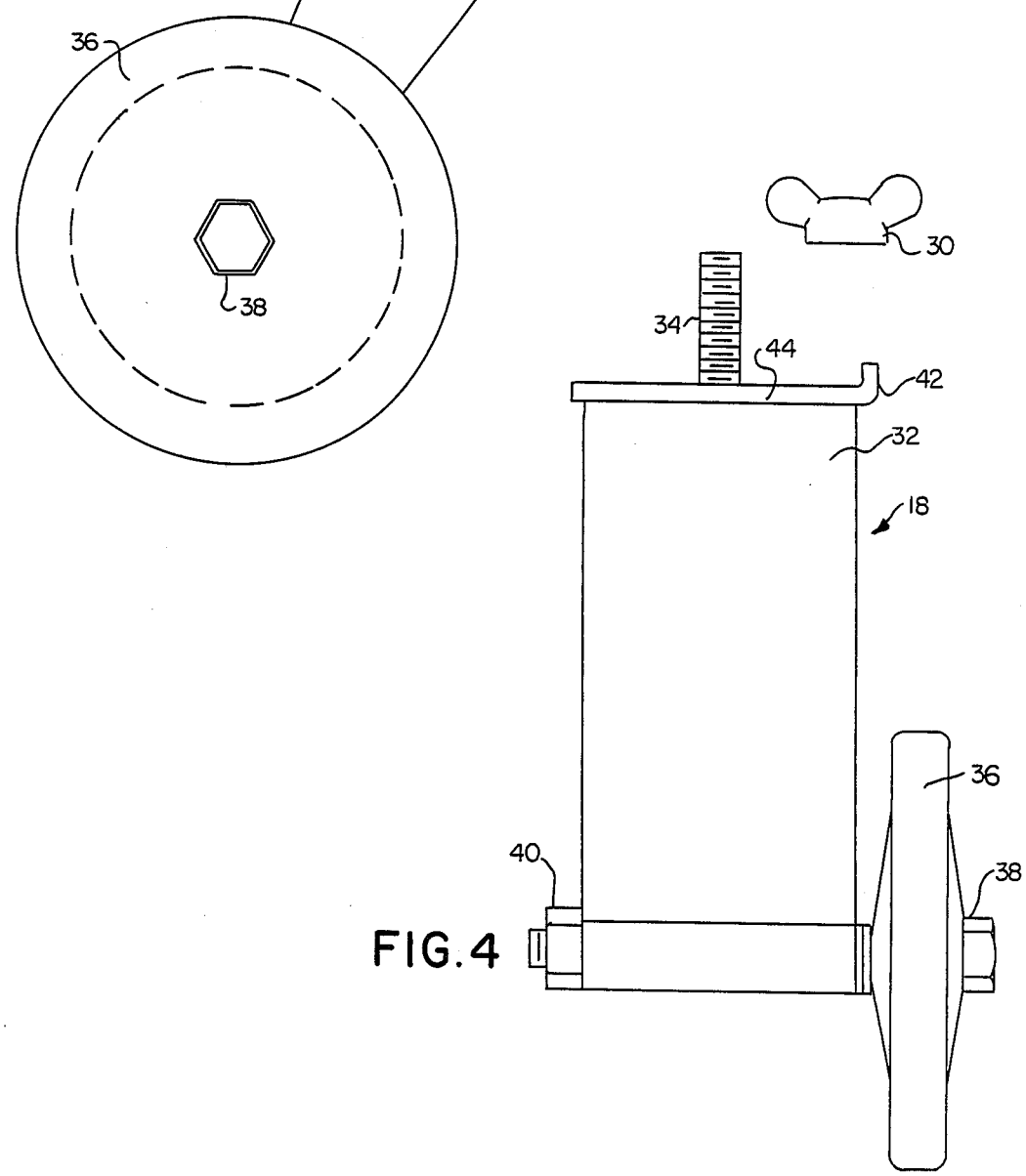
FIG. 4 is a front plan view of a rear wheel assembly constructed according to the invention.

Referring now to FIGS. 4 and 5, showing one rear wheel assembly 18 of the invention in greater detail, each rear wheel assembly 18 generally includes a swept back strut bracket 32 having a generally L-shaped transverse cross-section, a threaded shaft 34 rigidly attached to the top of bracket 32 and extending upwards therefrom, and a wheel 36 rotatably mounted on an outboard side and at the bottom of bracket 32, wheel 36 being rotatably mounted through the provision of a bolt 38 and an associated nut 40. Each rear wheel assembly 18 also includes an associated wing nut 30.

Preferably, the top of bracket 32 is provided on its outboard side with an upturned flange 42, which, as discussed below, limits the amount by which rear wheel assembly 18 can swivel about the axis of threaded shaft 34. In the present preferred embodiment of FIGS. 4 and 5, flange 42 is constructed by attaching an L-shaped plate 44, as by welding, transversely across the top of bracket 32, threaded shaft 34 then being secured to plate 44. Other constructions are, of course, contemplated as being within the scope of the present invention.

Bracket 32 is preferably of sufficient width at its top section, where it seats against truck cap 12, to prevent excessive forces from being applied to truck cap 12. With a light gauge truck cap 12 (for example, aluminum) and a bracket 32 having a relatively short seating length, the lateral edges of the truck cap could be deformed during transport of the cap. Inasmuch as the present invention is contemplated for use with a wide variety of truck caps, the seating length should be sufficient so as to not cause damage to the least sturdy of caps.

For improved mobility of the dismounted truck cap 12, strut bracket 32 is angled back with respect to threaded shaft 34 and is of sufficient length that the dismounted truck cap 12 will be provided with adequate ground clearance in its transportable state. Preferably, the length of strut bracket 32, measured along its axis is between about 6 inches and about 18 inches. Even more preferably, the length of strut bracket is about 10 inches. Additionally, the diameter of wheel 36 is between about 5 and about 20 inches, and even more preferably, about 7 inches. Still further, the angle of inclination which strut bracket 32 makes with the horizontal is preferably between about 45° and about 90°, and even more preferably about 45°.

The kit of the present invention also includes four wing nuts 30 each of which mates with one of threaded shafts 22 and 34, for attaching front roller assembly 16 and rear wheel assemblies 18 to truck cap 12.

Referring most particularly to FIG. 1, use of a kit constructed according to the present invention is as follows:

The hold down bolts securing truck cap 12 to the truck bed through holes 14 and the corresponding holes provided on laterally inturned edges of the truck cap are first removed. One of the two front corners of the cap is then raised sufficiently to provide clearance for insertion of threaded stud 22 of one front roller assembly 16 into one forward hole vacated by a hold down bolt. If truck cap 12 is relatively heavy, it can be blocked up, using, for example, a short piece of wood. One wing nut 30 is, at this point, installed on shaft 22 and tightened. The remaining front roller assembly 16 is then installed in the other front corner of truck cap 12 in a like manner.

The operator at this point walks to the rear of the truck and lifts cap 12 at a rearward portion and draws the cap backwards from the truck bed a sufficient distance to expose a pair of hold down bolt holes provided in the rearward lateral edges of truck cap 12. When the operator draws cap 12 rearward, front roller assemblies 16 track along the upturned edges of the sidewalls of the truck bed, i.e., along the surface wherein there are provided holes 14.

At this point, the two rear wheel assemblies 18 are attached to the rear corners of truck cap 12 via the exposed bolt holes, and two wing nuts 30 are threaded and tightened on shafts 34.

As shown in FIG. 1, rear wheel assemblies 18 are installed such that upturned flanges 42 substantially parallel the lateral sides of truck cap 12. Perfect wheel alignment is not necessary, but flanges 42 limit the amount by which rear wheel assemblies 18 can swivel. Excess swivel, in either direction, is prevented by contact of flange 42 with a lateral side of truck cap 12.

Once both front roller assemblies 16 and rear wheel assemblies 18 have been so installed and wing nuts 30 sufficiently tightened, the operator may lift truck cap 12 at the rear and continue to walk backwards until the front roller assemblies 16 reach the rear edge of the sidewalls of the truck bed. At this point the operator lowers the rear of the truck cap 12 such that rear wheel assemblies 18 contact the terrain. The operator may then lift the forward portion of truck cap 12 and roll it to any area for temporary storage, etc.

The kit may remain attached during storage such that the truck cap is always mobile.

To install or reinstall a truck cap using the present invention, the above steps are merely carried out in a reverse order.

The invention as described hereinabove in the context of a preferred embodiment is not to be taken as limited to all of the provided details thereof, since modifications and variations thereof may be made without departing from the spirit and scope of the invention.

What is claimed is:

1. A kit for enabling one person to easily and efficiently remove a truck cap from over a truck bed, said truck bed being provided with sidewalls, and reinstall the cap over the truck bed, said cap being provided with hold down bolt holes, said kit comprising:
   detachable wheels, said detachable wheels consisting of only four wheel means;
   said wheel means including:
   detachable forward roller means for attaching to and detaching from a forward portion of said truck cap, and for rollingly engaging said sidewalls and maintaining said truck cap in rolling engagement with said sidewalls when said detachably forward roller means are attached to said truck cap and when said truck cap is disposed over said truck bed; and
   detachable rear wheel means having a different configuration than said forward roller means and for attaching to and detaching from a rear portion of said truck cap and for providing said truck cap with rolling mobility over terrain upon removal of said truck cap from said truck bed;
   said detachable forward roller means each comprising a bracket, a roller rotatingly mounted in said bracket, a shaft attached to said bracket and dimensioned to engage at least one of said bolt holes provided in said truck cap, and fastening means for retaining said shaft in engagement with said at least one bolt hole;

said forward roller means comprising wheels having substantially an apple core shape;

each said rear wheel means including extension means, each said extension means including a flange for engagement with said truck cap to limit rotation of said extension means and its associated rear wheel means with respect to said truck cap, whereby said wheel means are removed when said truck cap is installed in position on a vehicle.

2. The kit according to claim 1, wherein said detachable forward roller means comprises a non-marring rotatable surface for engaging said sidewalls of said truck bed.

3. A kit for enabling one person to easily and efficiently remove a truck cap from over a truck bed, said truck bed being provided with sidewalls, and reinstall the cap over the truck bed, said cap being provided with hold down bolt holes, said kit comprising:

detachable wheels, said detachable wheels consisting of only four wheels;

said wheels including:

detachable forward roller means for attaching to and detaching from a forward portion of said truck cap, and for rollingly engaging said sidewalls and maintaining said truck cap in rolling engagement with said sidewalls when said detachably forward roller means are attached to said truck cap and when said truck cap is disposed over said truck bed; and detachable rear wheel means having a different configuration than said forward roller means and for attaching to and detaching from a rear portion of said truck cap and for providing said truck cap with rolling mobility over terrain upon removal of said truck cap from said truck bed;

said detachable rear wheel means comprising a bracket, a wheel rotatingly mounted in said bracket, a shaft attached to said bracket and dimensioned to engage at least one of said bolt holes provided in said truck cap, and fastening means for retaining said shaft in engagement with said at least one bolt hole said forward roller means comprising wheels having substantially an apple core shape;

each said rear wheel means bracket including a flange for engagement with said truck cap to limit sidewise pivoting rotation of each said rear wheel means with respect to said truck cap, whereby said wheel means are removed when said truck cap is installed in position on a vehicle.

4. A kit for enabling one person to easily and efficiently remove a truck cap shell from over a truck bed, said truck bed being provided with sidewalls, and reinstall the cap over the truck bed, said kit comprising:

detachable wheels, said detachable wheels consisting of only four wheels;

said wheels including:

detachable forward roller means for attaching to and detaching from a forward portion of said truck cap shell and for rollingly engaging said sidewalls and maintaining said truck cap shell in rolling engagement with said sidewalls when said detachably forward roller means are attached to said truck cap shell and when said truck cap shell is disposed over said truck bed; and detachable rear wheel means having a different configuration than said forward roller means and for attaching to and detaching from a rear portion of said truck cap shell and for providing said truck cap shell with rolling mobility over terrain upon removal of said truck cap shell from said truck bed;

said detachable forward roller means comprising a bracket, a roller rotatingly mounted in said bracket, a shaft attached to said bracket and dimensioned to engage at least one of said bolt holes provided in said truck cap shell, and fastening means for retaining said shaft in engagement with said at least one bolt hole;

said forward roller means comprising wheels having substantially an apple core shape;

each said rear wheel means including extension means having a flange for engagement with said truck cap to limit sidewise pivoting rotation of each said rear wheel means with respect to said truck cap, whereby said wheel means are removed when said truck cap is installed in position on a vehicle.

5. The truck cap according to claim 4, wherein said detachable forward roller means comprises a non-marring rotatable surface for engaging said sidewall of said truck bed.

6. The truck cap according to claim 4, wherein said detachable rear wheel means comprises a bracket, a wheel rotatingly mounted in said bracket, a shaft attached to said bracket and dimensioned to engage at least one of said bolt holes provided in said truck cap shell, and fastening means for retaining said shaft in engagement with said at least one bolt hole.

7. The truck cap according to claim 4, wherein said extension means comprises said flange formed on said bracket and disposed so as to parallel a lateral edge of said truck cap shell and thereby limit the swivel of said rear wheel means when said rear wheel means is attached to said truck cap shell.

* * * * *